Figure 1:
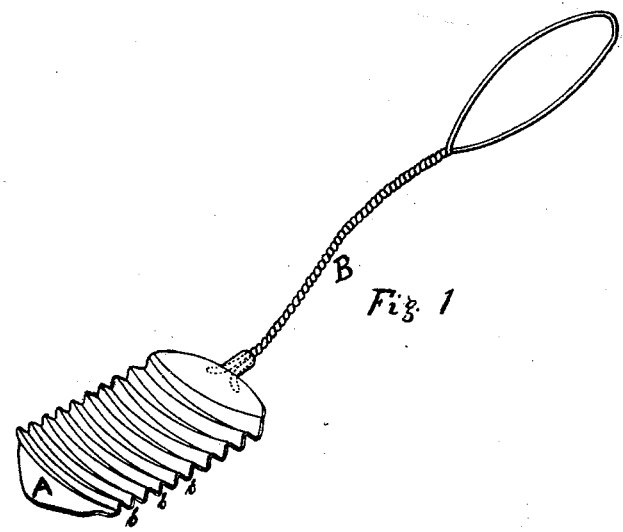

H. P. HOOD.

Improvement in Egg-Beaters.

No. 130,297.  Patented Aug. 6, 1872.

Witnesses:
Jas. E. Hutchinson
C. L. Evert

Inventor.
Harrison P. Hood

UNITED STATES PATENT OFFICE.

HARRISON P. HOOD, OF INDIANAPOLIS, INDIANA.

IMPROVEMENT IN EGG-BEATERS.

Specification forming part of Letters Patent No. 130,297, dated August 6, 1872.

*To all whom it may concern:*

Be it known that I, HARRISON P. HOOD, of Indianapolis, in the county of Marion and in the State of Indiana, have invented certain new and useful Improvements in Egg-Beaters; and do hereby declare that the following is a full, clear, and exact description thereof, reference being had to the accompanying drawing and to the letters of reference marked thereon making a part of this specification.

My invention relates to that class of egg-beaters which approach the spoon in shape and perform their office by being held in the hand and rapidly vibrated through the mass of egg to be beaten. The object of my invention is to produce an instrument for this purpose which shall be very light and at the same time strong enough for the purpose, and which shall present a large number of cutting-edges and corners for the purpose of dividing the particles of egg; and, also, which will carry a certain amount of air into the mass of egg and cause it to quickly assume a light foamy consistency.

Figure 1 is a view of my invention in perspective.

A is the blade or bowl, which is formed from a plate of tin or other suitable material. This plate is provided with corrugations, $b\ b\ b$, which serve to strengthen and stiffen it, thus allowing it to be very light and at the same time strong; and also presenting many cutting-edges, for dividing the mass of egg, and channels, through which the egg is forced. B is a handle, which, in this case, I have made of twisted wire and attached by solder to the blade or bowl, but which may be made of any suitable material and attached in any suitable manner.

The manner of operation is as follows: The egg to be beaten is placed in a plate or other suitable vessel, and the beater, being held by the handle, is rapidly and repeatedly passed through the mass, which, being divided by the edges of the corrugations into many streams, is quickly mixed with the air and caused to assume the light foamy appearance desired.

What I claim as my invention is—

The corrugated blade or bowl A, substantially as described, and for the purpose set forth.

In testimony that I claim the foregoing I have hereunto set my hand this 3d day of August, 1872.

HARRISON P. HOOD.

Witnesses:
 JAS. E. HUTCHINSON,
 C. L. EVERT.